UNITED STATES PATENT OFFICE.

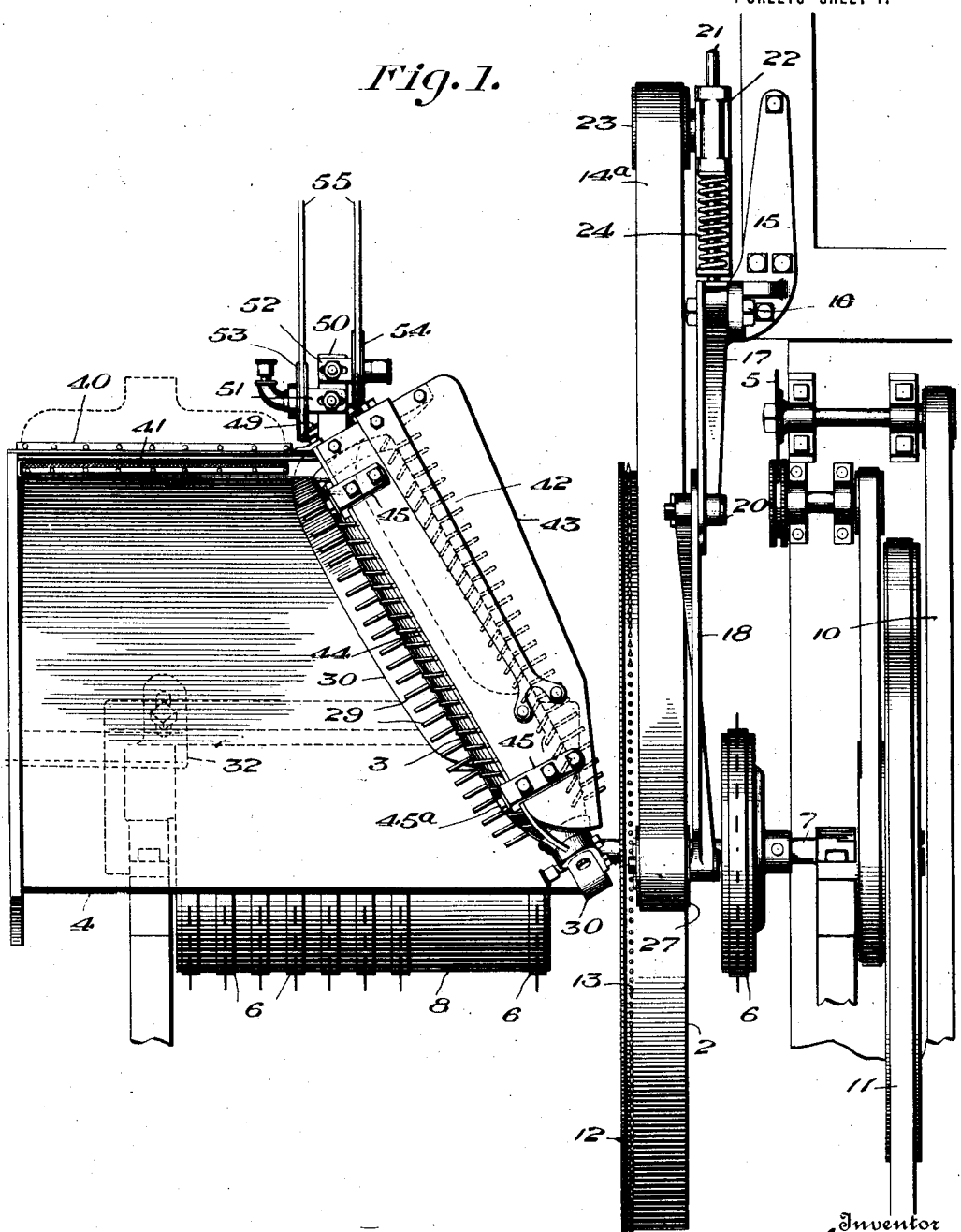

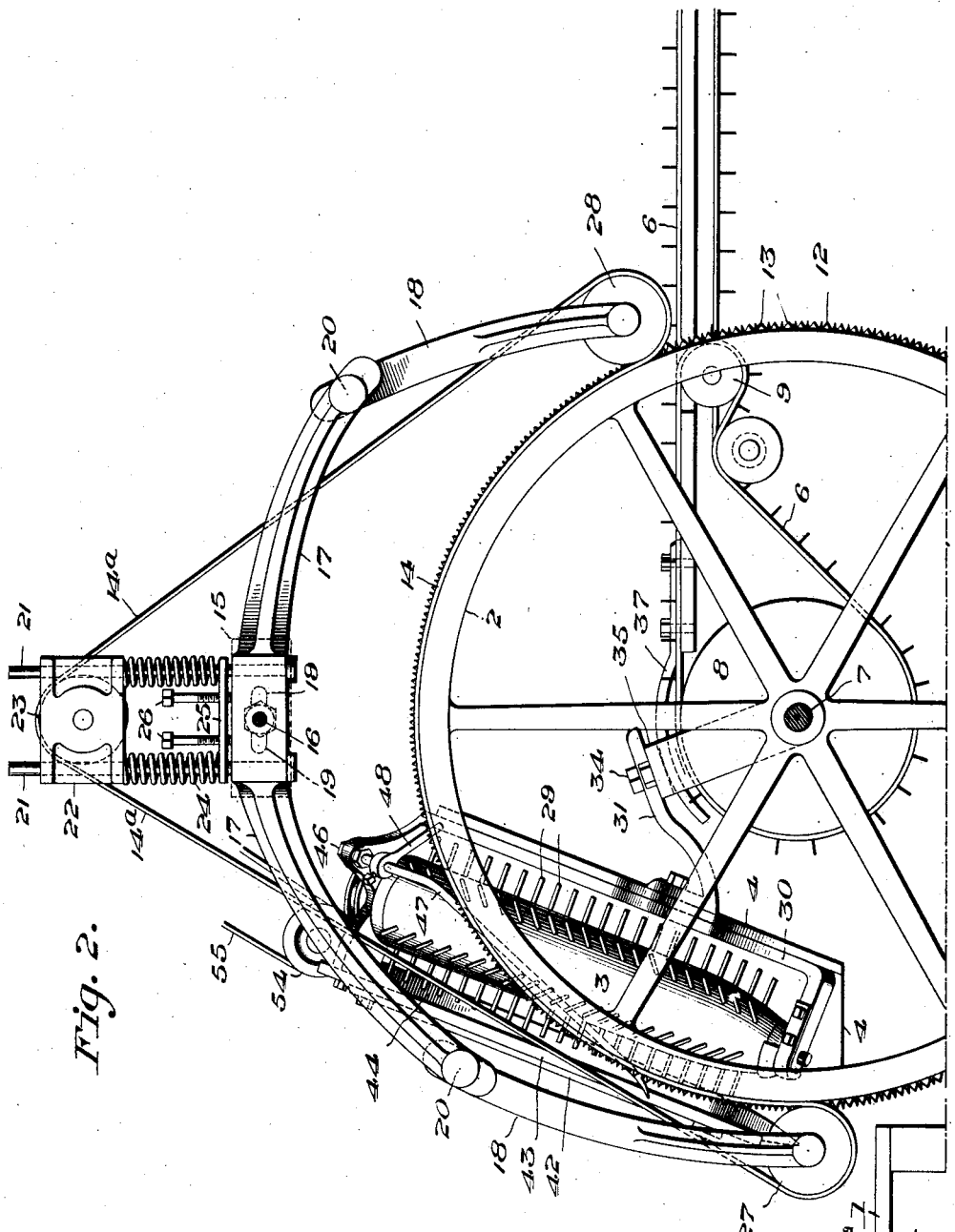

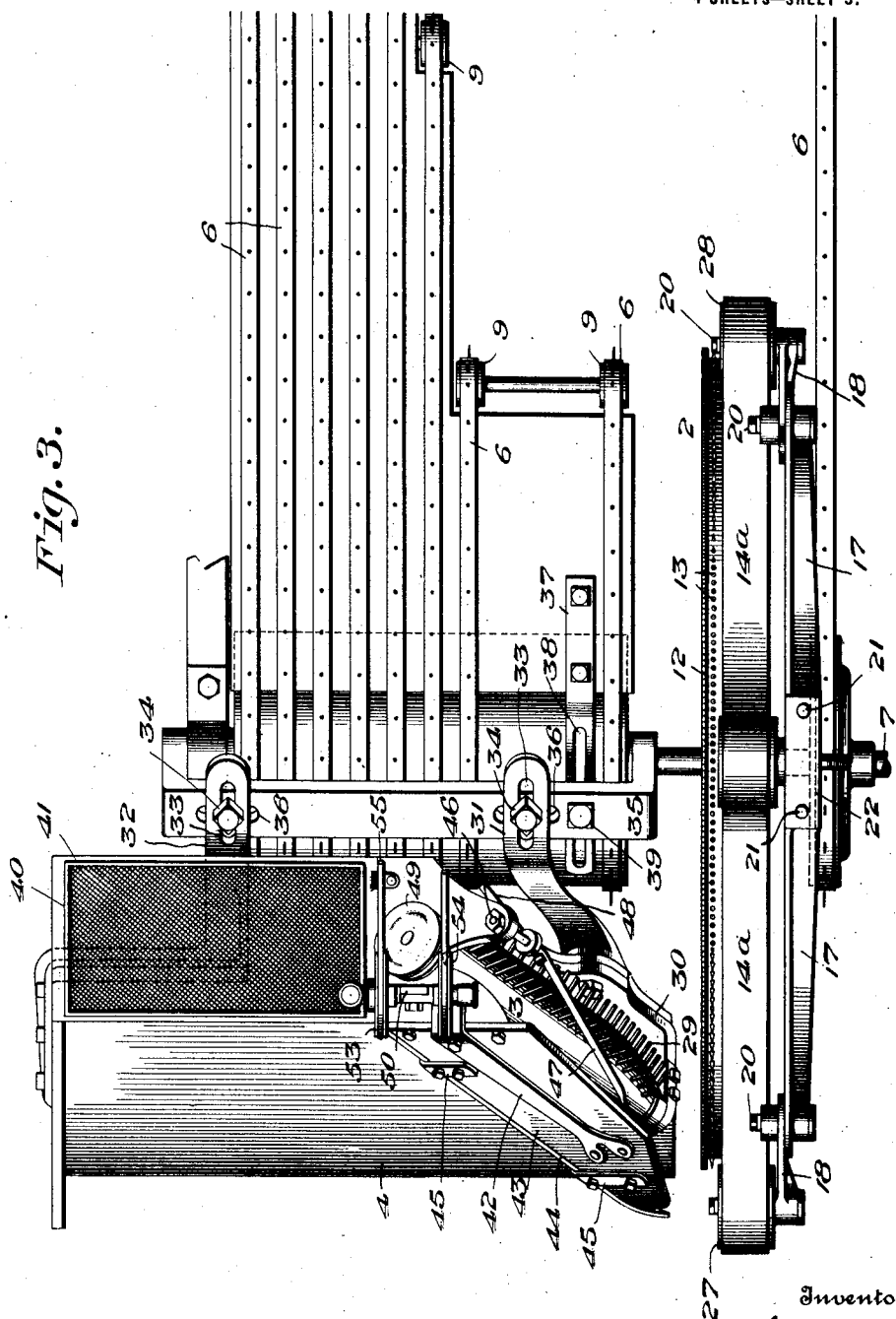

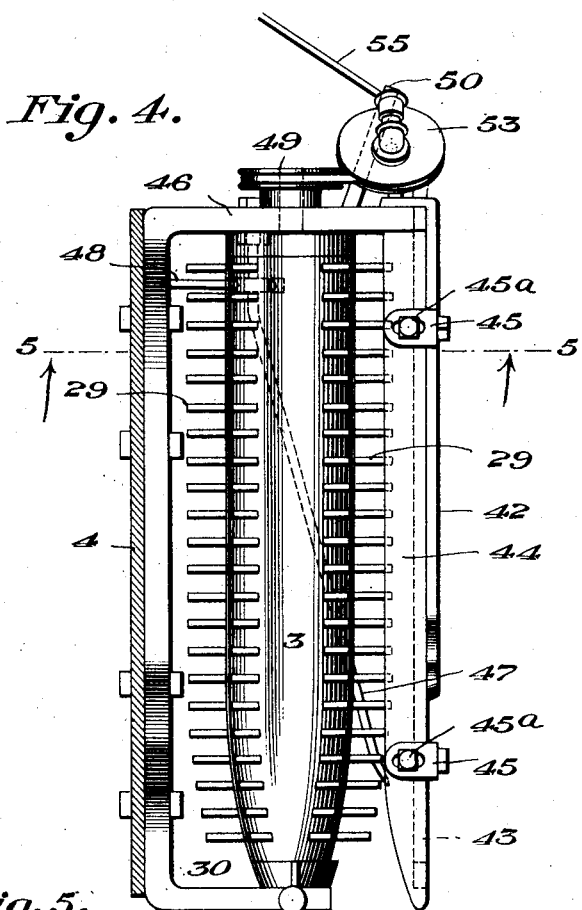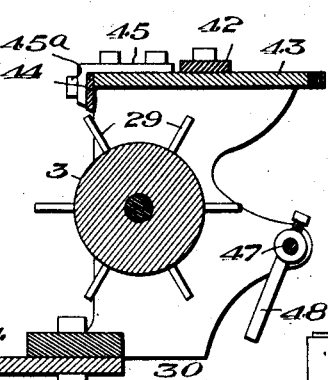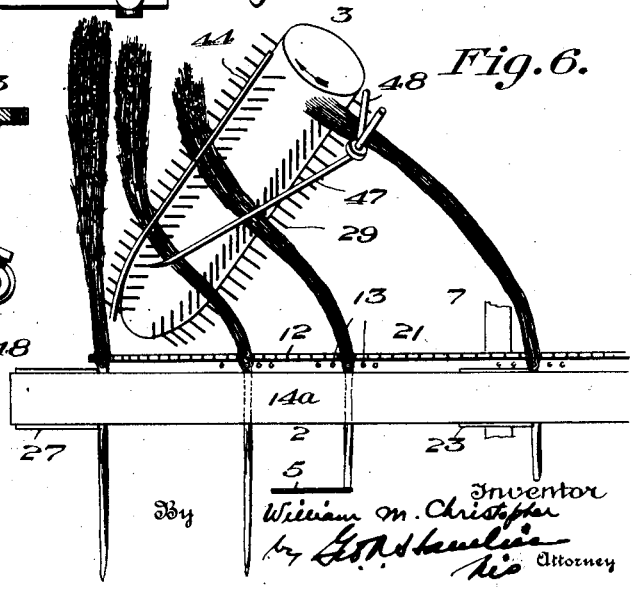

WILLIAM M. CHRISTOPHER, OF AMSTERDAM, NEW YORK, ASSIGNOR TO PIONEER BROOM COMPANY, OF AMSTERDAM, NEW YORK, A CORPORATION OF NEW YORK.

SCRAPING ATTACHMENT FOR BROOM-CORN-SIZING MACHINES.

1,344,332.

Specification of Letters Patent. Patented June 22, 1920.

Application filed June 16, 1919. Serial No. 304,423.

*To all whom it may concern:*

Be it known that I, WILLIAM M. CHRISTOPHER, a citizen of the United States, residing at Amsterdam, in the county of Montgomery and State of New York, have invented certain new and useful Improvements in Scraping Attachments for Broom-Corn-Sizing Machines, of which the following is a specification.

This invention relates to an attachment for a sizing machine for scraping or stripping the seeds from broom corn and delivering the scraped or stripped stalks of corn to the sizing machine, thereby accomplishing in one machine the scraping or stripping, cutting off of the butts, and sizing of the stalks.

Broom corn comes in varying lengths from six inches to four feet and carries a large number of seeds on the spangles. These seeds must be removed before the splints of corn are adapted for use in the manufacture of brooms. Furthermore, according to machines and methods heretofore used in removing these seeds, there has been considerable breakage of the spangles, resulting in loss of a part of the effective lengths of the splints.

A common method of treating broom corn is to feed it by hand to a toothed roller which combs off the seeds after it has been sized. The hand feeding for the purpose of removing the seeds is a slow operation.

My invention combines in one machine the seeding and sizing operations and, further, the mechanism is so constructed and adapted to operate that not only is the corn thoroughly seeded, but breakage of the spangles and main portions of the splints is minimized. The seeded corn is delivered direct to the sizing portion of the machine.

The invention embodies a rotary scraper or stripper provided with novel guards or guides, a stop, and other means, whereby as the corn is pulled through the teeth of the scraper or stripper, a peculiar and improved action on the broom corn results which insures the removal of the seeds without injury to the splints and spangles.

The invention also embodies novel feeding or conveying means for drawing the broom corn along and through the scraper or stripper; further, my improvements contemplate the novel combination of the carrying or conveying means and the scraper or stripper.

Other features of the invention reside in the manner of mounting the scraper or stripper so that it may be adjusted to different positions; the detail construction of the stripper and the parts which coöperate therewith; still further in various features which appear more fully hereinafter.

The feeding means of the invention comprises a novel combination of feeding wheel, belt for gripping the stalks of broom corn to the wheel, and adjustable and tensioned mounting for the belt and the relationship of the belt thereto, all combining to prevent slipping of the stalks and to insure their positive feed, without danger of injury or splitting, as the corn is drawn along and through the scraper or stripper.

I am aware that various changes of construction could be resorted to in carrying out my invention without departing from the essential principles thereof and it is to be understood, therefore, that the disclosure is illustrative, and not restrictive, of the scope of the invention.

In the accompanying drawings,

Figure 1 is a front elevation;

Fig. 2 a side elevation;

Fig. 3 a plan view;

Fig. 4 a detail side view of the rotary scraper or stripper, the bottom of the seed box or chute being in section;

Fig. 5 a section on line 5—5 of Fig. 4 looking in the direction indicated by the arrows; and Fig. 6 a diagrammatic view showing the action of the carrier wheel and rotary scraper on the broom corn.

Referring more particularly to Figs. 2 and 3, only so much of that portion of the machine as relates to the sizing means is shown as will give a clear idea of the position and relationship of the carrier mechanism and the scraper.

The machine is supported by any suitable framework, the bunches of broom corn being placed on the table 1, thence fed to the carrier wheel 2 and being scraped or stripped of seeds by the rotary scraper or stripper 3. The seeds stripped from the broom corn fall onto the seed box or chute 4 and the butts of the stalks are cut off about five and one-half inches from where the splints join the butts by the rotary saw and grooved wheel shown at 5, Fig. 1, after which the seeded and cut stalks fall onto the endless carrier bands 6, Figs. 2 and 3. The bands 6 being of different lengths, size the corn and the different sizes drop off at suitable points as usual in sizing machines for broom corn.

The main drive shaft 7 has a drum 8 for driving the belts 6. Such other pulleys 9 as are necessary for driving those belts 6 which are not grouped, may be used. The saw 5 is driven by a belt 10 from the shaft 7. A suitable drive 11, deriving power from any source, operates the machine.

Carried by the shaft 7 is the conveying or carrier wheel 2 which has numerous teeth 12 and numerous pins 13 projecting from its periphery, the pins being located opposite the spaces between the teeth. The stalks of broom corn fed from the table 1 are engaged by the teeth 12 and impaled by the points 13. An endless belt 14 which bears on a portion of the smooth periphery of the wheel 2, presses the butt ends of the stalks against the periphery of the wheel and keeps the points 13 projecting in between the splints and retains the stalks in the notches between the teeth 12. Consequently, the stalks can neither twist out of position nor move lengthwise of themselves. As the points 13 project between the splints, instead of into the butts, the pull of the mechanism lengthwise on the stalks as they are being scraped, can not cause the butts to split. Furthermore, the manner in which the teeth 12 and the points 13 secure the stalks by the pressure of the belt 14, prevents any twisting or displacement of the corn.

Carried by a suitable bracket 15 on any part of the machine is a bolt 16 which suspends the yoke 17 and the arms 18. The yoke 17 has a slot 19 through which the bolt 16 passes; this affords means for sliding the yoke 17 and the arms or hangers 18 to the right or left, Fig. 2, to bring about any desired adjustment and effect the requisite points of initial contact of the belt 14 with the wheel 2. The hangers or arms 18 are pivoted at 20 to the yoke 17. Rising from the yoke 17 are rods 21 on which slides a block 22 carrying a sheave 23 over which the belt 14$^a$ passes. Coil springs 24 are interposed between the block 22 and a cross piece 25 which is adjustable by screws 26 to regulate the tension of the springs 24 and consequently the tension exerted on the belt 14$^a$. The hangers or arms 18 have idler pulleys 27, 28 around which the belt 14$^a$ runs. The arrangement of the yoke 17 or arms or hangers 18, in connection with the position of the pulley 23 is such that the stretches 14$^a$ of the belt lie between the pivots 20 and the periphery of the wheel 2. This gives an improved result, in that the tension of the belt tends to press the arms 18 toward the wheel 2 and to keep the belt firmly applied to the wheel. The rotation of the wheel 2 drives the endless belt 14$^a$ and the frictional contact is such that the stalks are firmly held to the wheel and are carried around with it.

The stripper or scraper 3, which is a rotary drum provided with pins or fingers 29, is mounted so that it lies at an angle to the vertical plane of the wheel 2 and also tilts rearwardly toward the belts 6. This rotary scraper or stripper is suitably journaled in a frame 30 to which the seed box 4 is fastened (Figs. 4 and 5). The seed box 4 and the frame 30 are supported by arms 31, 32 which have slots 33, said arms being adjustably bolted by bolts 34 to an inverted U-shaped frame 35 which is rockably mounted on the shaft 7. Slots 36 in the frame 35 provide, in connection with the slots 33, means whereby the arms 31, 32 may be adjusted laterally of the machine or longitudinally thereof. The bolts 34 can then be tightened to secure the frame 30 and the seed box 4 where adjusted. To lock the frame 35 in any desired tilted, or upright, position, there is provided an arc shaped bracket 37 on the main frame of the machine, said bracket having a slot 38 to receive the shank of a bolt 39 carried by the frame 35.

A suitable suction box 40, which has a screen 41, is connected up to any suitable source of vacuum (not shown) and takes off the seeds and dust from the seed box 4 without, however, permitting any broken pieces from passing off.

Overlying the rotary scraper 3 and secured to the frame 30 thereof in any suitable manner and also suitably strengthened by a brace 42, is a plate or board 43. An elongated guard or strip 44 is adjustably secured at 45$^a$ to brackets 45 which are fastened to the plate or guard board 43 and extends lengthwise of the scraper 3 and just clear of the tips of the fingers or teeth 29. The overlying relationship of the guard board 43 and the elongated guard 44 to the scraper, insures against the corn being thrown off by the rotation of the scraper, even when the corn is in its bent condition, as shown in Fig. 6. The guard 44 holds the corn down in between the fingers or teeth 29 and saves the spangles with the broom corn, those parts which are in the form of sprays and are liable to be broken off. In fact, the breakage of spangles has heretofore constituted a serious loss in the scraping or removal of seeds from broom corn. Secured to the frame 30 at 46 is a guard rod 47 which extends diagonally alongside the rotary scraper or stripper 3 and diagonally thereacross. This rod is located on that side of the scraper nearest the wheel 2 and which is provided with an adjustable stop 48 located at the upper end of the rotary scraper but adapted to be adjusted along the rod 47 to any desired point. The rod 47, as will be more clear from Figs. 4, 5 and 6, prevents the splints of the broom corn from breaking and also holds them down to the rotary scraper. The stop 48 constitutes an abutment to arrest the broom corn at a point when, from the direction of travel of the corn as controlled by the wheel 2 and belt 14, the corn is in position to be pulled directly away from the rotary scraper 3. Consequently, the long ends of the corn are stripped of their seeds by the action of the fingers or teeth 29. While this is being done, the action of the guard board 43 and the elongated guard 44 prevents breaking of the spangles.

On the end of the spindle of the rotary scraper 3 is a sheave 49. The frame 30 has a bracket 50 which carries adjustable brackets 51, 52 having spindles for sheaves 53, 54. A round belt 55 which passes over the sheaves 53, 54 and 49 drives the scraper. The belt may be operated from any suitable countershaft.

What I claim is:

1. In a machine for scraping or stripping broom corn, the combination with an upright carrier wheel for conveying the stalks, of a forwardly and upwardly inclined rotary scraper or stripper which is adapted to remove the seeds from the corn while the carrier is conveying the stalks.

2. In a machine for scraping or stripping broom corn, the combination with a traveling carrier for conveying the stalks with their lengths disposed in general horizontal position, of a forwardly and upwardly inclined rotary scraper or stripper whose axis of rotation is also disposed at an angle to the direction of travel of the carrier and which is located wholly on one side of said carrier, said scraper or stripper being adapted to remove the seeds from the corn while the carrier is conveying the stalks, and a guard directly coöperating with the scraper or stripper to hold the broom corn between itself and the scraper or stripper to insure continuing engagement of the broom corn with the scraper or stripper.

3. In a machine for scraping or stripping broom corn, the combination with a carrier wheel for conveying the stalks with their lengths disposed angularly to the plane of said wheel, of a rotary scraper or stripper whose axis of rotation is disposed at an angle to the plane of the carrier wheel, said scraper being adapted to remove the seeds from the corn while the carrier wheel is conveying the stalks.

4. In a machine for scraping or stripping broom corn, the combination with a carrier wheel, of a belt bearing on the periphery of said wheel and adapted to hold the stalks with their lengths disposed angularly to the plane of said wheel, and a rotary scraper or stripper whose axis of rotation is disposed at an angle to the carrier wheel, said scraper being adapted to remove the seeds from the corn while the carrier wheel is conveying the stalks.

5. In a machine for scraping or stripping broom corn, the combination with a carrier wheel for the stalks which is provided with teeth and with points for engaging the stalks, of a belt for holding the stalks against the wheel and in engagement with the teeth and points.

6. In a machine for scraping or stripping broom corn, the combination with a carrier wheel for the stalks which is provided with teeth and with points for engaging the stalks, of a belt for holding the stalks against the wheel and in engagement with the teeth and points, and a rotary scraper for removing the seeds from the broom corn, said scraper being so disposed that the stalks will be brought into engagement therewith as the wheel rotates.

7. In a machine for scraping or stripping broom corn, the combination with a carrier wheel for conveying the stalks, of a belt engaged with the periphery of the wheel and adapted to hold the stalks thereon, pivoted arms or hangers having idlers engaged with the belt, and another idler for the belt which is arranged so that the stretches of the belt running from the first two idlers to the idler last named lie between the pivots of the arms or hangers and the wheel.

8. In a machine for scraping or stripping broom corn, the combination with a carrier wheel for conveying the stalks, of a belt engaged with the periphery of the wheel and adapted to hold the stalks thereon, pivoted arms or hangers having idlers engaged with the belt, another idler for the belt which is arranged so that the stretches of the belt running from the first two idlers to the idler last named lie between the pivots of the arms or hangers and the wheel, and spring tension means coöperating with the belt.

9. In a machine for scraping or stripping broom corn, the combination with a carrier wheel for conveying the stalks, of a belt engaged with the periphery of the wheel and adapted to hold the stalks thereon, pivoted arms or hangers having idlers engaged with the belt, another idler for the belt and adjustable spring tension means for said idler whereby the tension on the belt may be adjusted, said last named idler being so arranged that the stretches of the belt running over the idlers first named lie between the pivots of the arms or hangers and the carrier wheel.

10. In a machine for scraping or stripping broom corn, the combination with a carrier wheel which is provided with devices for engaging the stalks, of a belt bearing on the periphery of said wheel which is adapted to hold the stalks engaged with said devices on the carrier wheel, a yoke which is adjustably mounted, arms or hangers pivoted to the yoke and provided with idlers over which the belt runs, and another idler for the belt, the yoke being arranged so that when it is adjusted the points of initial and final contact of the belt with the carrier wheel may be changed.

11. In a machine for scraping or stripping broom corn, a rotary scraper having fingers in combination with a guard directly coöperating with the scraper to hold the broom corn between itself and the scraper to insure continuing engagement of the broom corn with the fingers.

12. In a machine for scraping or stripping broom corn, a rotary scraper having fingers in combination with a guard arranged lengthwise of the scraper and directly coöperating with said scraper for holding the broom corn in continuing engagement with the fingers.

13. In a machine for scraping or stripping broom corn, a rotary scraper having fingers in combination with an adjustable guard directly coöperating with and, arranged lengthwise of and alongside, the scraper and adapted to have its effective part relatively closely disposed to tips of the fingers of the scraper.

14. In a machine for scraping or stripping broom corn, a rotary scraper having fingers in combination with two guards, one arranged to prevent the spangles of the broom corn from being broken off, the other guard being adapted to hold the broom corn in engagement with the scraper.

15. In a machine for scraping or stripping broom corn, a rotary scraper having fingers in combination with two guards, one arranged to prevent the spangles of the broom corn from being broken off, the other guard being adapted to hold the broom corn in engagement with the scraper and having an adjustable stop adapted to be set at any desired point to arrest the travel of the broom corn as it is drawn along the scraper.

16. In a machine for scraping or stripping broom corn, a rotary scraper having fingers in combination with a guard extending lengthwise and diagonally across the scraper, and means for drawing the broom corn along the scraper between the guard and the scraper.

17. In a machine for scraping or stripping broom corn, a rotary scraper having fingers in combination with a guard extending lengthwise of the scraper, and a stop on said guard for arresting the broom corn as it is drawn along the scraper, said guard being adapted to hold the broom corn against the scraper.

18. In a machine for scraping or stripping broom corn, the combination with a rotary carrier wheel for conveying the stalks, of a forwardly and upwardly inclined rotary scraper or stripper whose axis is also arranged at an angle to the plane of the wheel, said scraper or stripper being adapted to remove the seeds from the corn while the wheel is carrying the stalks.

In testimony whereof I affix my signature.

WILLIAM M. CHRISTOPHER.